Aug. 11, 1953   J. E. SOCKE   2,648,380
METHOD OF CUTTING WEB INTO STRIPS
Filed April 28, 1948   2 Sheets-Sheet 1
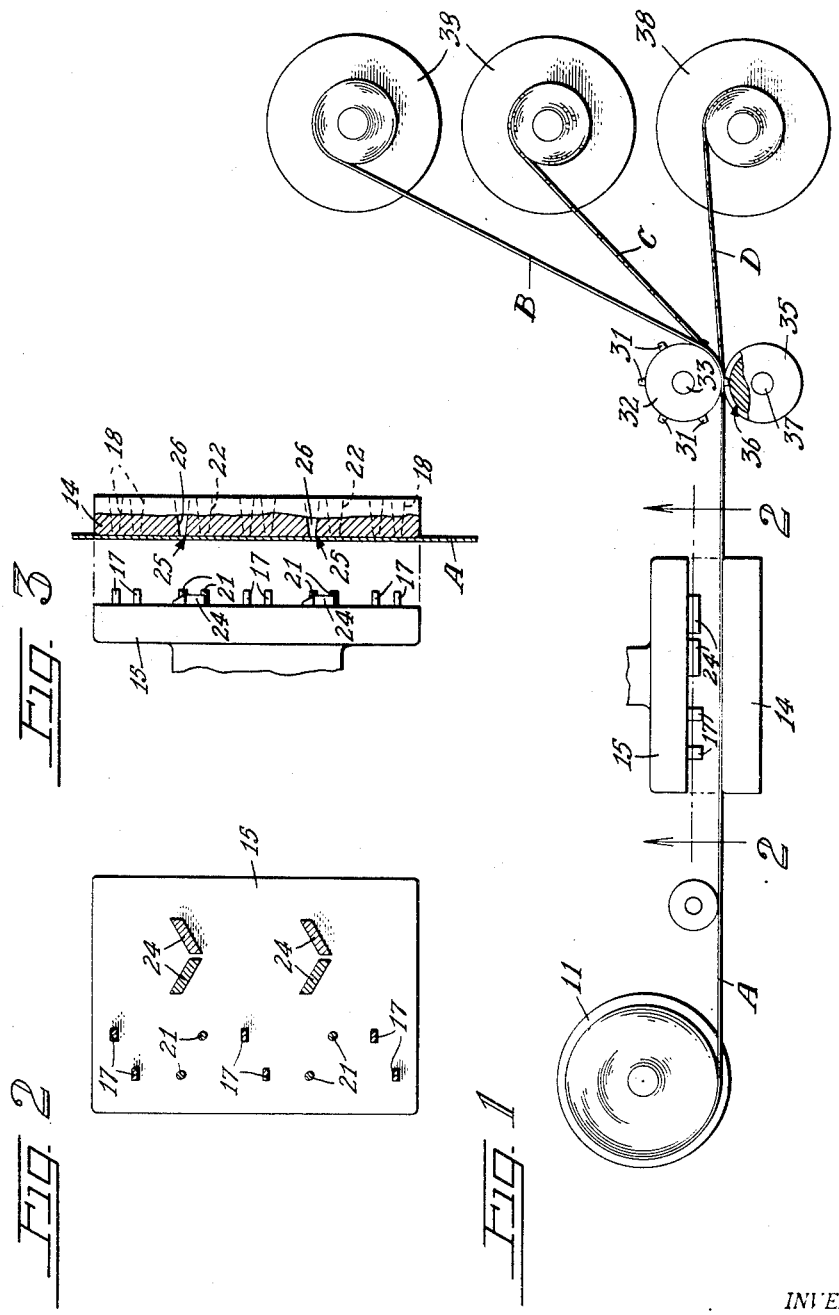
INVENTOR.
JOHN E. SOCKE
BY
ATTORNEYS Aug. 11, 1953 J. E. SOCKE 2,648,380
METHOD OF CUTTING WEB INTO STRIPS
Filed April 28, 1948 2 Sheets-Sheet 2
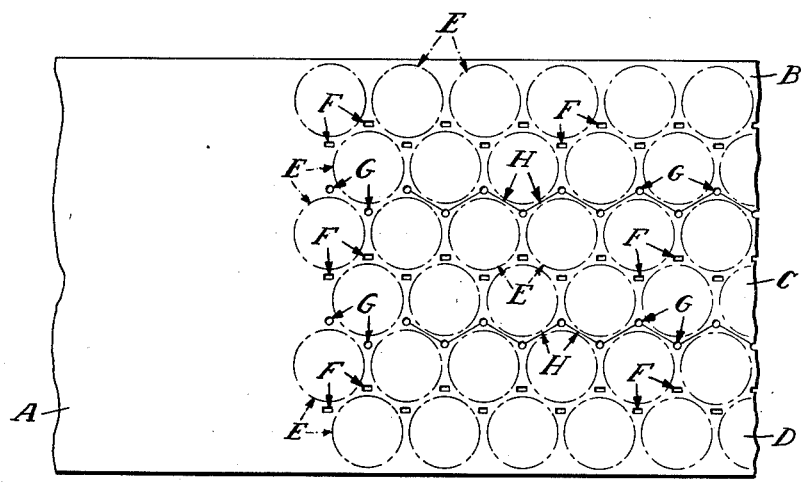
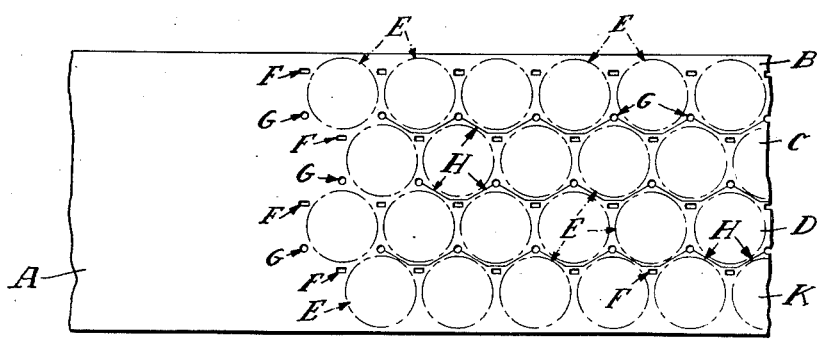
INVENTOR.
JOHN E. SOCKE
BY
ATTORNEYS Patented Aug. 11, 1953

2,648,380

UNITED STATES PATENT OFFICE 2,648,380

METHOD OF CUTTING WEB INTO STRIPS

John E. Socke, Pelham Manor, N. Y., assignor to American Can Company, New York, N. Y., a corporation of New Jersey Application April 28, 1948, Serial No. 23,801

3 Claims. (Cl. 164—17)

1

The present invention relates to a method of cutting sheet material into strips and has particular reference to cutting strips having undulated or scrolled edges closely defining potential blank spaces arranged in a row in a cutting pattern with a minimum of resulting scrap.

An object of the invention is the provision of a method of cutting sheet material into narrower or smaller strips containing potential blank spaces arranged in a row in a cutting pattern wherein the scrap material allowed to remain around the potential blank spaces is reduced to a minimum with the result that greater economy in the amount of material used for a given product may be effected.

Another object is the provision of such a method of cutting sheet material into smaller strips wherein it is possible to maintain extreme accuracy in cutting the material to a desired pattern and wherein feeding or gauging perforations are produced simultaneously with the cutting of the strips and such perforations are used for advancing the sheet material during the strip cutting operation.

Another object is the provision of such a method of cutting sheet material into smaller strips wherein extreme accuracy may be had in subsequently gauging or feeding the strips during the cutting of the product from the potential blank spaces of the cut strips while maintaining the scrap to a minimum.

Another object is the provision of such a method of cutting sheet material into smaller strips wherein simple punch and die and straight short cutting elements may be used in effecting the cutting of the strips with the extreme accuracy required for the greater economy in material used.

Numerous other objects and advantages of the invention will be apparent as it is better understood from the following description, which, taken in connection with the accompanying drawings, discloses a preferred embodiment thereof.

Referring to the drawings:

Figure 1 is a schematic view of an apparatus for carrying out the method steps of the instant invention, with parts broken away and parts shown in section, the view showing a web of material being cut into strips;

Fig. 2 is a sectional view of a die member which may be used in the apparatus, the view being taken substantially along the line 2—2 in Fig. 1;

Fig. 3 is a side elevation of the die mechanism shown in Fig. 1 with a portion of the web to be cut in position between the die members, the

2 female die member being broken away and shown in section;

Fig. 4 is an enlarged plan view of a portion of a web of material and showing how the web is accurately cut into smaller strips; and Fig. 5 is a view similar to Fig. 4 and showing a modified form of the invention.

As a preferred or exemplary embodiment of the instant invention the drawings disclose method steps of cutting a substantially continuous comparatively wide web A (Figs. 1 and 4) of sheet material, such as tin plate, fibre sheets, plastic sheets or the like, into a plurality of smaller strips (B, C, D) having undulated edges closely defining potential blank spaces E arranged in rows in a cutting pattern with a minimum of resulting scrap so that articles such as container parts, can ends or the like may be subsequently cut or formed from the potential blank spaces in the strips.

In accordance with the steps of the instant method, a plurality of feeding and gauging perforations F are cut into the web A outside of (in the scrap portion or waste portion of the web) and in predetermined positions relative to a row of the potential blank spaces E. Simultaneously with this action a plurality of cutting or die clearance perforations G are formed in the web outside of (in the in-between or remaining scrap or waste portions of the web) and in predetermined positions relative to the row of potential blank spaces E. Following this perforating of the web A, the web is advanced by engagement with the feeding and gauging perforations F a distance exactly equal to the pitch or spacing of the potential blank spaces E. Upon this advancement of the web additional feeding and gauging perforations F and cutting clearance perforations G are cut into the web in longitudinal alignment with the previously cut perforations and simultaneously with this action the web between the previously formed cutting clearance perforations is cut through along lines of severance H by cutting elements bearing a fixed relation to the perforating elements and the web is thereby divided into the strip portions B, C, D.

Thus as the web A is intermittently advanced through exact distances and accurately gauged or positioned by the feeding and gauging perforations F and is simultaneously perforated and cut, the substantially continuous web is divided into a plurality of substantially continuous narrower or smaller strips, each containing one or more longitudinal rows of extremely accurately located potential blank spaces (Figs. 4 and 5). Such a strip may be subsequently fed through a conventional punch press or the like, utilizing the feeding and gauging perforations F for advancing the strip and accurately locating its potential blank spaces in the press for accurate removal of a blank or formed product therefrom while leaving a minimum of scrap material.

Fig. 4 of the drawings shows a portion of a web A having six longitudinal rows of potential blank spaces E disposed in staggered arrangement for economy of material, the web being divided along undulated lines of severance for reduction of scrap material, in accordance with the instant method steps, into three strips B, C, D, each containing two rows of staggered potential blank spaces. The invention is equally well adapted to cutting the web along straight or other shaped lines of severance and to providing one or more than one row of potential blank spaces, as desired. Where each strip is to contain only one row of potential blank spaces E, a modified layout similar to that shown in Fig. 5 may be used in which there is provided one set of feeding and gauging perforations F and one set of cutting clearance perforations G for each row of potential blank spaces. The web in this modified form as shown is divided into four narrow strips B, C, D and K.

With such a method of dividing a web A into several narrower strips B, C, D each containing accurately located potential blank spaces, a simple punch and die mechanism equipped with equally simple cutting blades may be used for the cutting operation. Such simple mechanism has the advantage of economical cost and upkeep and a greater advantage of extreme accuracy in setting and operation.

One such form of mechanism is shown in the drawings for carrying out the steps of the instant method. In this form of mechanism the substantially continuous web A of material is unrolled from a reel 11 (Fig. 1) of such material and is advanced intermittently between a pair of die instrumentalities which include a lower stationary die 14 and an upper movable punch 15. These die elements may form parts of a more elaborate machine such as a conventional punch press or the like having parts for supporting the stationary die 14 and for actuating the movable punch 15 toward and away from the die 14 through a working stroke and a return stroke.

The punch 15 carries a plurality of punch members 17 (Figs. 2 and 3) which cooperate with recesses 18 in the die 14 for cutting the feeding and gauging perforations F in the web A. These punch members 17 and recesses 18 preferably are rectangular in cross-section for cutting the rectangular perforations F. The drawing shows six of these punch members 17 arranged in pairs and individually staggered for each strip B, C, D (Fig. 4) to be cut from the web and are located in transverse rows in predetermined positions for properly cutting the perforations F relative to the potential blank spaces E in the web.

In a similar manner, the punch 15 carries four punch members 21 which cooperate with recesses 22 in the die for cutting the cutting clearance perforations G in the web A. These punch members 21 and recesses 22 preferably are round in cross-section for cutting circular perforations G. These clearance punch members and recesses are arranged in pairs and individually staggered for each strip to be cut from the web and are located in transverse rows in alignment with the punch members 17 and recesses 18, and in predetermined positions for properly cutting the perforations G relative to the potential blank spaces E in the web.

The same punch 15 carries a plurality of cutting blades 24 which cooperate with auxiliary cutting edges 25 formed adjacent recesses 26 in the die 14 for cutting the web A along the undulated lines of severance H to divide it into the several strips B, C, D. These cutting blades and edges are simple short straight elements. There are two pairs of these cutting blades 24 and cutting edges 25 arranged in an angular position relative to the clearance punches 21 as shown in Fig. 2 and spaced in advance thereof a distance equal to the pitch or spacing of the potential blank spaces E for cutting the web along a line joining the clearance perforations G, the length of the blades 24 and cutting edges 25 being such as to extend into the clearance perforations G but not extend beyond them.

In starting a web A through the die mechanism a prepared portion of the web having two or three sets of the feeding and gauging perforations F accurately laid out and formed therein is attached to the leading end of the web A to be divided into strips. This prepared portion of web is fed through the die mechanism and its leading perforations F are engaged with teeth 31 (Fig. 1) of a set of three spaced and parallel feeding and gauging sprockets 32 mounted on a driving shaft 33 of a feeding device disposed adjacent the die mechanism. The shaft 33 is rotated intermittently in any suitable manner in time with the reciprocation of the movable punch 15, preferably on the up or return stroke of the punch. With each reciprocation of the punch the sprockets 32 are rotated through a partial rotation sufficiently to advance the web A exactly one pitch or spacing of the potential blank spaces in the web. A pressure roller 35 having an annular peripheral clearance groove 36 for the sprocket teeth 31 presses the web against the sprocket 32 for this advancement of the web. This pressure roller is mounted on a shaft 37 which is rotated in any suitable manner in synchronism with the sprocket shaft 33.

Thus after each advancement of the web A, and while the web is at rest, the punch 15 moves down through a working stroke. Since the punch members 17, 21 and the cutting blades 24 are all carried by the same punch 15 they all move down with the punch simultaneously and thus all cut through the web A simultaneously. Hence as the web A is advanced intermittently through the die mechanism, repeated reciprocations of the punch 15 simultaneously form a longitudinal staggered series each of the feeding and gauging perforations F and the clearance perforations G, and also simultaneously sever the web A along the undulated lines of severance H immediately in advance of said formed series of perforations F and G, to progressively cut the web into the strips B, C, D. The strips as they are formed are rolled up into reels 38 for subsequent use.

Since there is a fixed relation between the location of the cutting blades 24, die clearance punches 21 and the feeding and gauging punches 17, as well as a simultaneous cutting action of all three, each repeated cutting operation is an exact duplication of a previous cutting operation and hence an exact undulated line of severance H is produced which closely defines the potential blank spaces with a minimum of resulting scrap. And since the same feeding and gauging perforations F are used to locate the web A during the strip cutting operation and also during a subsequent blank cutting operation in another machine, the potential blank spaces are located extremely accurately and thus a minimum scrap allowance is made available without fear of damaging the blanks subsequently cut from the strips.

In providing the clearance perforations G for the ends of the cutting blades 24, a complete severance of the web A is insured. Thus it is unnecessary to provide extremely accurate meeting or intersection of the ends of the cuts made by these blades to form a continuous line of severance H.

In cutting for example, four strips B, C, D and K, each having a single row of potential blank spaces E as shown in Fig. 5, the same mechanism may be used, excepting that instead of two single straight cutting elements 24 as shown in Fig. 2, the cutting blades 24 and cutting edges 25 will have a three sided contour which corresponds with and which produces a three sided undulated line of severance between two adjacent cutting perforations G as shown in Fig. 5.

It is thought that the invention and many of its attendant advantages will be understood from the foregoing description, and it will be apparent that various changes may be made in the steps of the process described and their order or accomplishment without departing from the spirit and scope of the invention or sacrificing all of its material advantages, the process hereinbefore described being merely a preferred embodiment thereof.

I claim:

1. The method of cutting a plurality of strips from a web of sheet material, each strip containing a multiple number of potential blanks longitudinally arranged in two rows with the potential blanks in one row staggered with respect to the potential blanks in the adjacent row, said strip also containing potential waste portions disposed between said rows of potential blanks, which method consists in initially forming feeding and gauging perforations in longitudinal series in said potential waste portions in the web, simultaneously and initially forming strip cutting perforations in longitudinal series in similar waste portions between adjacent potential strips in the web, advancing the thus initially perforated web by engaging said feeding and gauging perforations, and cutting the web longitudinally and entirely between said strip cutting perforations simultaneously with the formation of a succeeding series of said feeding and gauging perforations and said cutting perforations for progressively dividing the web into a plurality of strips, each strip containing two rows of potential blanks disposed in staggered relation and a longitudinal series of feeding and gauging perforations in the waste portions between said rows for future feeding of said strips for removal of blanks therefrom.

2. The method of cutting a plurality of strips from a web of sheet material, each strip containing a single row of potential blanks arranged in longitudinally spaced relation, each strip also containing potential waste portions disposed exteriorly of said potential blanks, which method consists in initially forming a plurality of longitudinally spaced feeding and gauging perforations in said potential waste portions between said potential blanks, simultaneously and initially forming a plurality of longitudinally spaced strip cutting perforations in other potential waste portions of the web between said rows, advancing the thus initially perforated web by engaging said feeding and gauging perforations, and cutting the web longitudinally and entirely between said strip cutting perforations simultaneously with the formation of a succeeding plurality of said feeding and gauging perforations and said cutting perforations for progressively dividing the web into a plurality of strips, each strip containing a single row of potential blanks disposed in longitudinally spaced relation and a plurality of longitudinally spaced feeding and gauging perforations between said potential blanks for subsequent feeding of said strips for removal of blanks therefrom.

3. The method of cutting a plurality of strips from a web of sheet material, each strip containing at least one row of potential blanks arranged in longitudinally spaced relation, each strip also containing potential waste portions disposed exteriorly of said potential blanks, which method consists in initially forming a plurality of spaced feeding and gauging perforations in longitudinal series in said potential waste portions between said potential blanks, simultaneously forming a plurality of spaced strip cutting perforations in longitudinal series in other potential waste portions between adjacent potential strips in the web, advancing the thus initially perforated web by engaging said initially formed feeding and gauging perforations, and cutting the web longitudinally and entirely between said strip cutting perforations simultaneously with the formation of a succeeding plurality of said feeding and gauging perforations and said cutting perforations for progressively dividing the web into a plurality of strips, each strip containing at least one row of potential blanks disposed in longitudinally spaced relation and a plurality of longitudinally spaced feeding and gauging perforations between said potential blanks for subsequent feeding of said strips for removal of blanks therefrom.

JOHN E. SOCKE.

References Cited in the file of this patent
UNITED STATES PATENTS

| Number | Name | Date |
| --- | --- | --- |
| 788,851 | Schneider | May 2, 1905 |
| 1,158,864 | Schmid | Nov. 2, 1915 |
| 1,603,265 | Beyer | Oct. 19, 1926 |
| 1,949,430 | Murch | Mar. 6, 1934 |
| 2,162,925 | Weiss | June 20, 1939 |
| 2,222,842 | Humphrey | Nov. 26, 1940 |
| 2,378,041 | Sebell | June 12, 1945 |
| 2,458,538 | Socke | Jan. 11, 1949 |